United States Patent [19]

O'Brien

[11] Patent Number: 4,561,300
[45] Date of Patent: Dec. 31, 1985

[54] TEMPERATURE LOGGING WHILE DRILLING

[75] Inventor: John T. O'Brien, Bartlesville, Okla.

[73] Assignee: Phillips Petroleum Company, Bartlesville, Okla.

[21] Appl. No.: 561,696

[22] Filed: Dec. 15, 1983

[51] Int. Cl.[4] .............................................. E21B 47/06
[52] U.S. Cl. .................................... 73/154; 116/207; 116/217
[58] Field of Search ................... 73/154; 374/160, 141; 116/207, 217

[56] References Cited

U.S. PATENT DOCUMENTS

| 2,787,906 | 4/1957 | Piety ...................................... 73/155 |
| 2,788,662 | 4/1957 | Wiley ..................................... 73/151 |
| 3,260,112 | 7/1966 | Godbey et al. ........................ 73/356 |
| 3,513,705 | 5/1970 | Severin .............................. 116/217 X |
| 3,802,269 | 4/1974 | Cooper ............................. 116/217 X |
| 3,977,245 | 9/1975 | Clark et al. ............................ 73/151 |
| 4,033,186 | 7/1977 | Bresie .................................... 73/154 |
| 4,353,990 | 10/1982 | Manske et al. .................. 116/217 X |
| 4,390,291 | 6/1983 | Gaven, Jr. et al. ................. 374/160 |

OTHER PUBLICATIONS

Gaven et al., "Chemical Temp Indicators...," 3/78, by Spectro-Systems Inc. for DOE/DGE, EG-77-C-0-1-4008.
Patton et al., "... Continuous Wave, Logging-While-Drilling Telemetry System", J. Pet. Tech., Oct. 1977, pp. 1215-1221.

Primary Examiner—Jerry W. Myracle
Attorney, Agent, or Firm—French and Doescher

[57] ABSTRACT

A temperature recorder suitable for circulation with a well drilling fluid is provided with a spherical casing and/or a plurality of minute samples of known melting point and/or positioning of the samples in the mouth of a capillary structure so that the melting of the sample is unambiguous.

17 Claims, 4 Drawing Figures

TEMPERATURE LOGGING WHILE DRILLING

BACKGROUND OF THE INVENTION

In one aspect, the invention relates to peak temperature logging while drilling a well bore in the earth. In another aspect, the invention relates to a temperature recorder which can be used to log temperatures while drilling a well bore in the earth.

It is sometimes very important to determine the peak temperature of drilling fluid as it is circulated during the drilling of a well. In the drilling of oil and gas and geothermal wells, the drilling fluid is usually a mud which contains bentonite. The drilling fluid is circulated from the earth surface down the drill pipe and through openings in the drill bit adjacent the bottom of the well. The drilling fluid returns in the annulus between the drill pipe and the sidewall of the well to the earth surface. During the drilling operation, the peak temperature in the circulating well fluid does not occur at the bottom of the well adjacent the drill bit but rather in the annulus surrounding the drill bit at some distance from the bottom of the well. When drilling is halted, the peak temperature usually occurs at the bottom of the well. The highest temperature to which the drilling fluid is exposed is determined by equilibrium, taking into account the temperature and circulation rate of the drilling fluid.

Knowledge of the temperature in the formation can be very important. A high geothermal temperature history of a formation over the course of time can produce relatively undesirable viscous crude and tars. A low geothermal temperature history can fail to provide liquid petroleum deposits. Where a geothermal energy source is the drilling objective, the rock temperature is directly related to the energy obtainable from the source. Further, serious damage to the drilling fluid can occur as a result of continued circulation at a temperature where thermal degradation results. When it is known that the thermal limits of the drilling fluid are being approached, steps can be taken to protect the circulating drilling fluid against thermal deterioration.

OBJECTS OF THE INVENTION

It is an object of this invention to provide a temperature recorder to measure downhole well bore temperatures while drilling.

It is another object of this invention to provide a device for measuring the peak temperature reached by a drilling fluid during the drilling of a well.

It is a further object of this invention to provide a device for measuring downhole temperatures that requires neither the drill pipe and bit to be removed from the well nor the lowering of electrical devices downhole.

STATEMENT OF THE INVENTION

In one embodiment of the present invention a temperature recorder comprises a casing having a generally spherical outer surface and a plurality of thermal indicators carried inside it. The spherical casing is recoverable from the drilling fluid over a narrow time span since its passage velocity is not dependent upon its orientation. Further, the spherical shape has substantial structural integrity and provides good resistance to damage from the drill bit. Using a plurality of thermal indicators in the casing allows the maximum drilling fluid temperature to be determined accurately following the recovery of a single temperature recorder.

In another aspect, a thermal indicator comprises a capillary tube having a mouth and a speck of material, having a known melting point, positioned in the mouth. When the material melts, the speck will disappear, being drawn as a liquid into the capillary tube. Whether or not the material has melted can then be determined with a high degree of reliability even with very minute samples.

In yet another aspect of the present invention a temperature recorder comprises a casing having a generally spherical outer surface and a plug member removably mounted in the casing. A plurality of thermal indicators of known melting points are fixed to the plug member. The plug member is formed from a material having a microcapillary porous structure so that the thermal indicators are wicked away upon their melting. This device provides great simplicity of construction.

In yet another aspect of the invention, there is provided a method comprising the introduction of a plurality of generally spherical temperature recorders into the drilling fluid to be circulated down a drill pipe past a bit on the drill pipe and up the annulus between the drill pipe and the wall of the borehole. The generally spherical temperature recorders are formed from a durable material so as to resist damage from circulation with the fluid and have a sufficiently small radius to flow past the bit without interference.

DETAILED DESCRIPTION OF THE INVENTION

Figure 1:
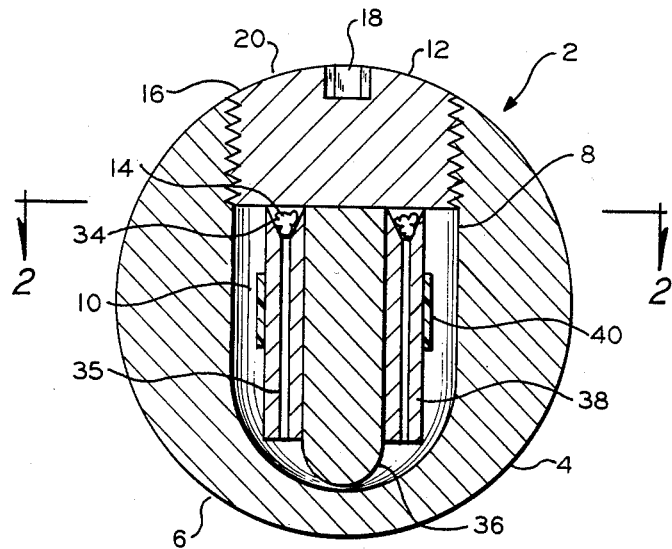
FIG. 1 is a side cross sectional view illustrating certain features of one embodiment of the present invention.

According to the invention, a temperature recorder 2 comprises a casing 4 having a generally spherical outer surface 6. The casing 4 is preferably formed from a material which will resist stresses encountered in a borehole. Preferably, the casing 4 is formed from a non-magnetic material to avoid sticking to the drill stem in the event it becomes magnetized. Forming the casing 4 from stainless steel, brass, aluminum, ceramic, or high melting plastic is preferred. The casing 4 should have a sufficiently small radius to flow past the drill bit. Depending on circumstances, providing the casing with a radius in the range of 0.5 to about 10 millimeters can be advantageous. Generally, the casing 4 will have a radius in the range from about 0.5 to about 5 millimeters where it is desired to measure temperatures without "tripping out," so that the casing can flow past the bit. During bit changing operations, ("tripping out") it is contemplated that a casing 4 having a radius in the range of 2.5 to about 10 millimeters would be acceptable.

A plurality of thermal indicators 14 are mounted inside of the casing 4. Usually, the indicators 14 are mounted on a plug member 12 positioned in the casing.

Figure 3:
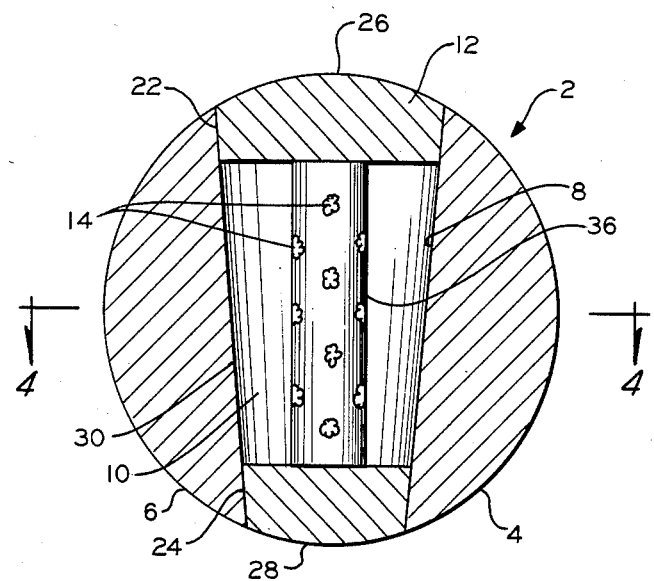
FIG. 3 is a cross sectional view showing certain features of further aspects of the present invention.

To accept the plug member 12 the casing 4 can be provided with a borehole 8 extending at least partially through it. Preferable, the borehole 8 is generally cylindrical or frustoconically shaped although the sidewall can have most any shape which provides for the formation of a sample chamber in the casing 4. The borehole 8 can be threaded if desired as shown in FIG. 1. It can extend all the way through the casing 4 if desired as shown in FIG. 3.

The plug member 12 is preferably removably mounted in the casing 4. The plug member 12 preferably has the plurality of thermal indicators 14 affixed to it. Generally speaking, the plug member will usually be cylindrically or frustoconically shaped, although other shapes may be suitable. The plug member 12 is usually mounted in the casing 4 along the radius of the casing because the casing 4 can be formed with minimal size where the plug member is mounted along its radius. In the embodiment of the invention shown in FIGS. 1 and 2, the plug member 12 extends part way through the casing 4 and has a threaded generally cylindrical exterior surface 16 engaging the threaded portion of the borehole 8 adjacent the generally spherical surface 6 of the temperature recorder 2 to seal the sample chamber 10 from the environment. A tool fitting 18 for receipt of a screw driver or Allen wrench or the like can be provided at the upper end 20 of the plug member 12 for its easy removal. It can be provided with a slot extending along one side for orientation in a holder for inspection of the indicators. In the embodiment of the invention shown in FIGS. 3 and 4, the plug member is provided with generally frustoconical shaped outer surfaces 22 and 24 at its upper end 26 and its lower end 28 respectively to sealingly engage with a generally frustoconically shaped portion of the borehole 8 which is adjacent the generally spherical surface 6 of the casing.

Figure 2:
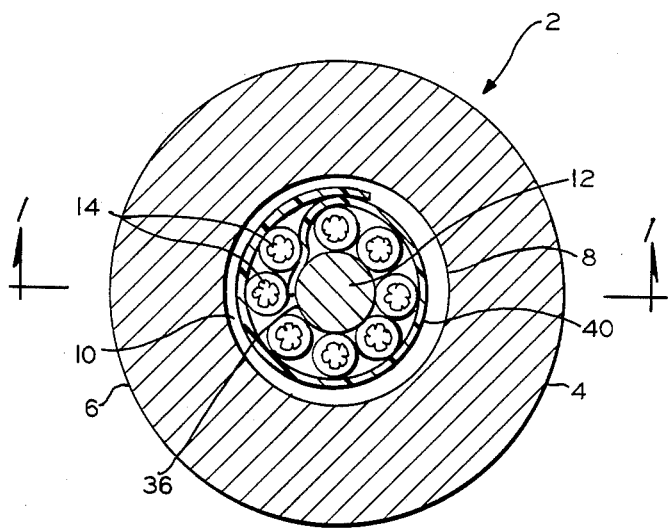
FIG. 2 is a cross sectional view of the device in FIG. 1 as would appear along line 2—2.

The plug member 12 of the embodiment of the invention shown in FIGS. 1 and 2 can be formed from any material sufficiently durable to withstand the stresses which would be encountered by circulating it with a drilling fluid and is preferably a material which is compatible with the material forming the casing 4.

Figure 4:
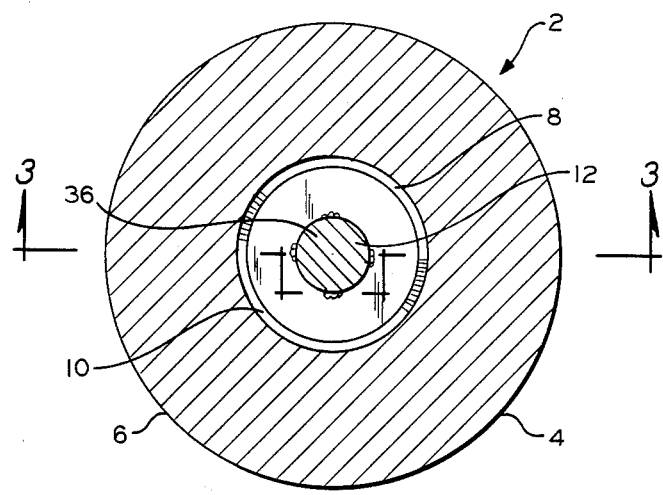
FIG. 4 is a cross sectional view of the device shown in FIG. 3 as would be seen along lines 4—4.

It is important to those aspects of the invention relating to disappearance of the sample upon melting that the portion of the device carrying the samples be connected to a capillary. In the embodiment of the invention shown in FIGS. 1 and 2, the thermal indicator 14 is formed by a speck of material positioned in the mouth 34 of a capillary 35 so as to be drawn into the capillary in the event it melts. The speck of material 14 positioned in the mouth 34 has a known melting point. The capillary will generally have an inside diameter of less than 1 mm, usually less than 0.5 mm. It can be formed from glass or stainless steel, for example. Where a plurality of such thermal indicators are attached to the plug member 12 each having a known melting point, the thermal history of the temperature recorder can be determined with great precision. For the embodiment of the invention as shown in FIGS. 3 and 4 it is preferred that at least the portion 30 of the plug member 12 carrying the thermal indicators 14 be formed from a material which has a capillary network within it so that it will wick away the thermal indicators upon their melting. Usually the portion 30 will possess a microcapillary porous structure such as can be provided when it is formed from ceramic materials or compression molded metal particles such as brass or bronze. Alternatively, the portion 30 of the plug member 12 in FIGS. 3 and 4 can be formed conventionally and then coated with a material such as silica gel which will wick away the samples 14 upon their melting.

In one arrangement, the plug member 12 is provided with a shaft 36 which carries the thermal indicators 14. The shaft 36 can be generally cylindrical in shape. In the embodiment of the invention shown in FIGS. 1 and 2, a plurality of capillary tubes 38 are positioned parallel to the shaft 36 and attached to the shaft 36. As shown in FIG. 2, one convenient method of attaching the capillary tubes 38 to the shaft 36 is with a piece of tape 40. An array of the capillaries 38, each carrying a sample 14 positioned in its mouth, can be arranged in side-by-side relationship on the tape 40, the array wrapped around the shaft 36 and then the plug member inserted into the casing.

Generally speaking, each of the thermal indicators will be formed from a speck of material melting sharply at a narrow characteristic temperature between about 75° C. and about 350° C. By 'speck' is meant an amount of material having a mass in the range of from about 10 to about 10,000 micrograms, for example. Larger or smaller samples could be used but would be less economic or convenient. Generally speaking, the size of the samples will be in the range from about 0.1 to about 1 millimeter. Although the thermal indicators can be formed from organic materials having a sharp melting point, various metals or alloys are preferred for use since they can be drawn into a fine wire such as a wire having a diameter of about 0.2 millimeters and cut to length. Various materials each having an appropriate melting point are suitable. Many of them contain at least one of bismuth, tin and lead. The following table illustrates suitable alloys.

TABLE OF CANDIDATE ALLOYS

| Compound Name or Alloy Composition (wt. %) | Melting point (°C.) | Melting range (°C.) | Melting point change (C.°/1000 psi) |
| --- | --- | --- | --- |
| Bi 48.5, In 41.5, Cd 10 | 76 | <0.1 | 0.028 |
| In 52.34, Bi 47.66 | 88 | <0.1 | 0.023 |
| Bi 52.5, Pb 32, Sn 15.5 | 96 | 0.3 | −0.031 |
| Bi 54, Sn 26, CD 20 | 103 | 0.3 | 0.024 |
| Bi 67, In 33 | 110 | <0.1 | −0.079 |
| In 52, Sn 48 | 118 | <0.1 | 0.52 |
| Bi 56.5, Pb 43.5 | 126 | 0.4 | −0.12 |
| Bi 56, Sn 40, Zn 4 | 133 | 0.5 | 0.054 |
| Bi 60, Sn 40 | 139 | 0.4 | −0.025 |
| Bi 60, Cd 40 | 147 | 0.5 | −0.0067 |
| Sn 68.35, Cd 29.25, Zn 2.4 | 159 | <0.1 | 0.77 |
| Sn 71, Pb 24, Zn 5 | 170 | 0.3 | 0.39 |
| Sn 67.75, Cd 32.25 | 175 | <0.1 | 0.084 |
| Sn 62.5, Pb 36.15 | 180 | 0.2 | 0.26 |
| Sn 61.9, Pb 38.1 | 184 | 0.6 | 0.32 |
| Sn 91, Zn 9 | 198 | <0.1 | 0.22 |
| Sn 91, Mg 9 | 205 | 0.8 | 0.42 |
| Sn 95.8, Ag 3,5, Cu 0.7 | 218 | 0.7 | 0.26 |
| Sn 96.5, Ag 3.5 | 222 | 0.1 | 0.26 |
| Sn 99.5, Al 0.5 | 229 | 0.7 | 0.24 |
| Sn | 231 | 0.3 | 0.29 |
| Sn 99.41, Cu 0.32, Al 0.27 | 234 | 0.1 | 0.26 |
| Pb 79.7, Cd 17.7, Sb 2.6 | 239 | 0.4 | 0.34 |
| Pb 84, Sb 12, Sn 4 | 243 | 0.6 | 0.31 |
| Pb 82.6, Cd 17.4 | 249 | 0.1 | 0.20 |
| Pb 88.9, Sb 11.1 | 253 | <0.1 | 0.21 |
| Bi 97.3, Zn 2.7 | 256 | 0.7 | −0.21 |
| Bi 97.5, Ag 2.5 | 263 | 0.6 | −0.22 |
| Cd 82.6, Zn 17.4 | 265 | 0.2 | 0.34 |
| Bi | 273 | 0.2 | −0.26 |
| Pb 91, Sb 4.68, Cd 4.32 | 276 | <0.1 | 0.36 |
| Ga 92, Mg 18 | 285 | 1.5 | 0.053 |
| Cd 92.45, Sb 7.55 | 294 | 0.6 | 0.50 |
| Pb 96.97, Ag 2.20, Sb 0.83 | 301 | <0.1 | 0.68 |
| Pb 97.5, Ag 2.5 | 303 | 0.4 | 0.48 |
| Pb 97.55, Ag 1.75, Sn 0.7 | 311 | <0.1 | 0.49 |
| Pb 98.1, Sb 1, Zn 0.9 | 315 | 0.5 | 0.59 |

-continued

TABLE OF CANDIDATE ALLOYS

| Compound Name or Alloy Composition (wt. %) | Melting point (°C.) | Melting range (°C.) | Melting point change (C.°/1000 psi) |
|---|---|---|---|
| Pb 97.4, Sn 2.6 | 320 | 0.5 | 0.61 |
| Pb 98.76, Sn 1.24 | 325 | 0.5 | 0.49 |
| Pb | 329 | 0.5 | 0.58 |
| Zn 92.97, Al 4.08, Mg 2.95 | 344 | 0.3 | 0.30 |
| Te 70.6, Ag 29.4 | 351 | 1.4 | 0.47 |

Generally speaking, certain aspects of the invention can be practiced by providing a plug member and spherical casing and inserting the plug member into the casing to provide the temperature recorder of the invention. The plug member has a plurality of temperature indicators affixed to it and the casing has a borehole in it for closely receiving the plug member. For the invention as shown in FIGS. 1 and 2, the plug member can be threaded into the casing; in which event it must be unthreaded when recovered from the drilling fluid. For the invention as shown in FIGS. 3 and 4, the plug member can be pressed into the casing and then pressed out when retrieved from the drilling fluid. In use, a plurality of the spherical temperature recorders are incorporated into the drilling fluid and circulated down the pipe, through the bit, and up the annulus between the pipe or stem and the wall of the borehole. Mud circulation can be interrupted when recorders are near the bottom of the borehole to allow the mud and recorders to rebound to near the temperature of the formation prior to its being disturbed by the drilling fluid and for drill bit changing if desired. The recorders can be retrieved from the mud recovered from the annulus. For example, they can be retrieved by filtration, by the use of magnets where the casing is ferromagnetic, or manually matched from the mud. They are disassembled and the undisturbed sample having the lowest melting point is noted. Where the samples have a known melting point and cover a known spectrum, they need not be arranged in any particular order as the highest temperature encountered by the recorder can be ascertained simply by counting the undisturbed samples. For example, if the plug member introduced into the drilling fluid carried a first indicator with a melting point of 100° C., a second indicator having a melting point of 126° C., a third indicator having a melting point of 147° C., a fourth indicator having a melting point of 175° C., and a fifth indicator having a melting point of 198° C., and the recovered recorder had two undisturbed samples, a maximum temperature in the range of 147° to 175° C. would be indicated. Generally, it is contemplated that the temperature recorder used in accordance with the invention will be provided with between about 3 and 30 thermal indicators or samples of known melting point. While certain preferred embodiments of the invention have been described, the invention is not to be limited thereto.

What is claimed is:

1. A temperature recorder comprising a casing having a generally spherical outer surface and a plug member mounted in said casing, said plug member being generally cylindrically or frustoconically shaped and mounted in said casing generally along a radius thereof, said plug member having a plurality of thermal indicators attached thereto.

2. A temperature recorder as in claim 1 wherein said plug member extends part way through said casing and has a threaded generally cylindrical exterior surface.

3. A temperature recorder as in claim 2 wherein the plug member extends completely through the casing and is provided with generally frustoconically shaped surface.

4. A temperature recorder as in claim 1 wherein the casing has a diameter in the range of about 1 to 10 mm and the thermal indicators attached to the plug member are each formed by a speck of material melting sharply between 75° and 350° C.

5. A temperature recorder as in claim 4 wherein the speck is positioned in the mouth of a capillary so as to be drawn into the capillary in the event it melts.

6. A temperature recorder as in claim 5 wherein the speck of material is formed from an alloy which contains at least one of bismuth, tin and lead.

7. A thermal indicator as in claim 4 wherein the material of known melting point is a material selected from the group consisting of
Bi 48.5, In 41.5, Cd 10
In 52.34, Bi 47.66
Bi 52.5, Pb 32, Sn 15.5
Bi 54, Sn 26, CD 20
Bi 67, In 33
In 52, Sn 48
Bi 56.5, Pb 43.5
Bi 56, Sn 40, Zn 4
Bi 60, Sn 40
Bi 60, Cd 40
Sn 68.35, Cd 29.25, Zn 2.4
Sn 71, Pb 24, Zn 5
Sn 67.75, Cd 32.25
Sn 62.5, Pb 36.15
Sn 61.9, Pb 38.1
Sn 91, Zn 9
Sn 91, Mg 9
Sn 95.8, Ag 3,5, Cu 0.7
Sn 96.5, Ag 3.5
Sn 99.5, Al 0.5
Sn
Sn 99.41, Cu 0.32, Al 0.27
Pb 79.7, Cd 17.7, Sb 2.6
Pb 84, Sb 12, Sn 4
Pb 82.6, Cd 17.4
Pb 88.9, Sn 11.1
Bi 97.3, Zn 2.7
Bi 97.5, Ag 2.5
Cd 82.6, Zn 17.4
Bi
Pb 91, Sb 4.68, Cd 4.32
Ga 92, Mg 18
Cd 92.45, Sb 7.55
Pb 96.97, Ag 2.20, Sb 0.83
Pb 97.5, Ag 2.5
Pb 97.55, Ag 1.75, Sn 0.7
Pb 98.1, Sb 1, Zn 0.9
Pb 97.4, Sn 2.6
Pb 98.76, Sn 1.24
Pb
Zn 92.97, Al 4.08, Mg 2.95
Te 70.6, Ag 29.4.

8. A temperature recorder comprising a casing having a generally spherical outer surface, a plug member removably mounted in said casing, and a plurality of thermal indicators of known melting point affixed to the plug member, said plug member being formed from a material having a microcapillary porous structure to wick away the thermal indicators upon their melting.

9. A temperature recorder as in claim 8 wherein the plug member is formed from ceramic or compression molded metal particles.

10. A temperature recorder as in claim 9 wherein at least a portion of the thermal indicators are formed from specks of materials containing at least one of bismuth, tin and lead.

11. A method comprising introducing a plurality of generally spherical temperature recorders into the drilling fluid to be circulated down a drill pipe, past a bit on the drill pipe, and up the annulus between the drill pipe and the wall of a borehole, said generally spherical temperature indicators being formed from a durable material so as to resist damage from circulation with the fluid and having a sufficiently small radius to flow past the bit.

12. A method as in claim 11 further comprising flowing said plurality of generally spherical temperature indicators with said drilling fluid down the drill pipe, past the bit and up the annulus between the drill pipe and the wall of the borehole.

13. A method as in claim 12 further comprising interrupting the flow of drilling fluid when at least one temperature indicator is near the bottom of the borehole for a period of time sufficient to allow the temperature of the drilling fluid to rebound to near that of the formation prior to its being disturbed by the drilling fluid, and recovering at least one of said temperature indicators from said drilling fluid after it has flowed up the annulus.

14. A method comprising providing a plug member, a plurality of temperature indicators and a spherical casing;
said casing having a borehole therein for closely receiving the plug member;
attaching said plurality of temperature indicators to the plug member; and
inserting the plug member into the casing.

15. A thermal indicator comprising a capillary tube having a mouth and a speck of material having a sharply defined melting point between about 75° and 350° C. positioned in the mouth.

16. A thermal indicator as in claim 15 wherein the capillary tube has an inside diameter of less than 0.5 mm and the speck of material has a mass in the range of from about 10 to about 10,000 micrograms.

17. A thermal indicator as in claim 16 wherein the capillary tube is formed from glass or stainless steel and the speck of material is selected from the group consisting of
Bi 48.5, In 41.5, Cd 10
In 52.34, Bi 47.66
Bi 52.5, Pb 32, Sn 15.5
Bi 54, Sn 26, CD 20
Bi 67, In 33
In 52, Sn 48
Bi 56.5, Pb 43.5
Bi 56, Sn 40, Zn 4
Bi 60, Sn 40
Bi 60, Cd 40
Sn 68.35, Cd 29.25, Zn 2.4
Sn 71, Pb 24, Zn 5
Sn 67.75, Cd 32.25
Sn 62.5, Pb 36.15
Sn 61.9, Pb 38.1
Sn 91, Zn 9
Sn 91, Mg 9
Sn 95.8, Ag 3,5, Cu 0.7
Sn 96.5, Ag 3.5
Sn 99.5, Al 0.5
Sn
Sn 99.41, Cu 0.32, Al 0.27
Pb 79.7, Cd 17.7, Sb 2.6
Pb 84, Sb 12, Sn 4
Pb 82.6, Cd 17.4
88.9, Sb 11.1
Bi 97.3, Zn 2.7
Bi 97.5, Ag 2.5
Cd 82.6, Zn 17.4
Bi
Pb 91, Sb 4.68, Cd 4.32
Ga 92, Mg 18
Cd 92.45, Sb 7.55
Pb 96.97, Ag 2.20, Sb 0.83
Pb 97.5, Ag 2.5
Pb 97.55, Ag 1.75, Sn 0.7
Pb 98.1, Sb 1, Zn 0.9
Pb 97.4, Sn 2.6
Pb 98.76, Sn 1.24
Pb
Zn 92.97, Al 4.08, Mg 2.95
Te 70.6, Ag 29.4.

* * * * *